US007035741B2

(12) United States Patent
Taylor

(10) Patent No.: US 7,035,741 B2
(45) Date of Patent: Apr. 25, 2006

(54) SYSTEMS AND METHODS FOR ACCURATELY MEASURING FLUID

(75) Inventor: Steven R. Taylor, Salt Lake City, UT (US)

(73) Assignee: Merit Medical Systems, Inc., South Jordan, UT (US)

( * ) Notice: Subject to any disclaimer, the term of this patent is extended or adjusted under 35 U.S.C. 154(b) by 0 days.

(21) Appl. No.: 10/872,212

(22) Filed: Jun. 18, 2004

(65) Prior Publication Data
US 2004/0236523 A1    Nov. 25, 2004

Related U.S. Application Data

(63) Continuation of application No. 10/293,159, filed on Nov. 12, 2002, now Pat. No. 6,814,427, which is a continuation of application No. 09/785,656, filed on Feb. 16, 2001, now abandoned.

(51) Int. Cl.
*G01F 1/00* (2006.01)
(52) U.S. Cl. ...................................................... 702/45
(58) Field of Classification Search .................. 702/45, 702/173, 145; 73/861, 19, 865, 866; 141/83; 210/90; 347/45, 4.5; 96/116; 604/65, 66; 44/253; 600/529
See application file for complete search history.

(56) References Cited

U.S. PATENT DOCUMENTS

| 5,807,321 A | * | 9/1998 | Stoker et al. .................. 604/65 |
| 5,810,058 A | * | 9/1998 | Kountz et al. ................. 141/83 |
| 5,925,829 A | * | 7/1999 | Laragione et al. ............ 73/861 |

* cited by examiner

*Primary Examiner*—John Barlow
*Assistant Examiner*—Tung S. Lau
(74) *Attorney, Agent, or Firm*—Workman Nydegger

(57) ABSTRACT

The present invention relates to systems and methods for measuring the amount of fluid. A fluid source is in fluid communication with a measuring system. The fluid source includes a non-collapsible walled container for dispensing or introducing fluid. The measuring system includes a sensor in fluid communication with the container that senses the volume of the gas, and a system that calculates the amount of fluid flowing through an opening of the container based on the amount of gas flowing through an opening of the container. The volume of gas entering or exiting the container is measured rather than directly measuring the amount of fluid leaving or entering the container to determine in a more accurate, less complicated and less expensive manner the volume of fluid.

2 Claims, 2 Drawing Sheets

SYSTEMS AND METHODS FOR ACCURATELY MEASURING FLUID

CROSS-REFERENCE TO RELATED APPLICATIONS

This application is a continuation of U.S. patent application Ser. No. 10/293,159, filed Nov. 12, 2002 now U.S. Pat. No. 6,814,427, entitled "SYSTEMS AND METHODS FOR ACCURATELY MEASURING FLUID," which is a continuation of U.S. patent application Ser. No. 09/785,656, filed Feb. 16, 2001 now abandoned, entitled "SYSTEMS AND METHODS FOR ACCURATELY MEASURING FLUID," which is incorporated herein by reference.

BACKGROUND OF THE INVENTION

1. The Field of the Invention

The present invention relates to systems and methods for accurately measuring an amount of fluid. More specifically, the present invention is directed to systems and methods for using a measurement of the amount of gas to measure, in a sterile, reliable and accurate manner, the amount of fluid that is dispensed from or introduced into a container.

2. The Relevant Technology

Since the beginning of science, practitioners have been required to measure the amount of liquid transferred from one container to another container or location. Traditional methods for performing such liquid transfer measurements have included the use of such devices as measuring cups or liquid flow meters. While each method has its own distinct and unique advantage, a number of drawbacks exist in the utilization of the traditional methods for measuring liquid transferred or dispensed from a container. As an example, the traditional methods can expose the transferred liquid to impurities within the environment, such as air-born bacteria, and allow for the introduction of human error into the measurements. The methods can also be complex and expensive, and unable to accurately measure low volumes of liquids due to varying densities and viscosities.

Additional drawbacks are specific to the application for which the liquid transfer measurements are being performed. By way of example, one area where practitioners are required to accurately measure the amount of liquid transferred or dispensed from a container is in the medical area of radiology, in which a radiopaque liquid known as "contrast medium" is inserted into a patient's body so as to provide a contrast in density between the area of the body that is being x-rayed and the contrast medium inserted.

When fluid, such as contrast medium, is intravenously administered, it is critical that air bubbles are not inadvertently introduced into the patient's vascular system. It is, therefore, important that the practitioner monitor and continually assess the amount of medium remaining in the container in order to prevent any possibility of inadvertently injecting air bubbles into the patient. Administering an excess amount of fluid, such as contrast medium, can also injure a patient. Due to the current expense of contrast medium, it is also very important for the practitioner dispensing the contrast medium to perform the process in a manner that results in the least amount of waste. For accurate billing and cost assessment purposes, a practitioner is required to monitor the exact amount of contrast medium that is delivered to each patient over the course of the patient's medical procedure or hospital stay. However, monitoring the exact amount of contrast medium administered to a patient is difficult, particularly when multiple contrast medium dispensers are used or when a dispenser is shared between two patients. This inability to accurately monitor the exact amount of medium administered can result in patients being incorrectly charged. The inaccuracies complicate any determination as to the amount of useful medium remaining in a dispenser and often result in the remainder being discarded rather than being used on a new patient. Given the high cost, such waste of contrast medium can translate into significant financial losses for facilities that perform a large number of these fluid-dispensing procedures.

This need to accurately measure the amount of contrast medium dispensed is one example of the current need to accurately and reliably measure liquid that is dispensed from a container.

BRIEF SUMMARY OF THE INVENTION

The present invention is directed to systems and methods for using a measurement of the amount of gas entering or exiting a container to measure, in a sterile, reliable and accurate manner, the amount of fluid that is dispensed from or introduced into a container.

Implementation of the present invention is performed in association with a non-collapsible container. The container comprises a rigid material such that as fluid is dispensed from the container and a vacuum is created, the container walls do not collapse. A measuring system that includes a sensor is in fluid communication with the container.

In one implementation of the present invention, a sensor is used for sensing the volume of the gas entering or exiting the container. The sensor can be a single sensor that performs both functions of sensing both the mass flow and the density of the gas, or can be a dual sensor wherein one sensor component senses the mass flow and another sensor component senses the density. Optionally, a measurement of the gas density can be preprogrammed into the sensor or calculating system such that the sensor only senses gas flow. The volume of gas entering or exiting the container may also be measured in a variety of different manners.

The calculating system calculates the amount of fluid dispensed from or introduced into the container based on the amount of gas flowing into or out of the container. The calculating system typically comprises an electrical system that includes a microprocessor and/or an analog-to-digital converter, but can comprise a variety of different systems, such as a mechanical system that determines the amount of gas flowing due to fluid dispensed from or introduced into a container. The fluid may comprise a liquid, such as contrast medium or a variety of different fluids.

A filtering system may optionally be used to maintain a sterile environment and to protect the sensor. Therefore, in light of the overall system, the gas entering or exiting the container is measured rather than directly measuring the amount of fluid leaving or entering the container, causing the measurement to be more accurate, less complicated, and less expensive.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems and methods for measuring the amount of fluid. More specifically, the present invention is directed to systems and methods for using a measurement of a volume of gas to measure, in a sterile, reliable and accurate manner, the volume of fluid that is dispensed from or introduced into a container. The embodiments of the present invention may comprise a fluid source coupled in fluid communication to a calculating system, as will be discussed in greater detail below.

Throughout the disclosure, reference is made to calculating the volume of fluid based on the amount of gas that flows through an opening of a container as a result of fluid flowing through an opening of a container. In the disclosure and in the claims the term "gas" refers to any type of gas or combination of gasses that are allowed to enter the fluid source. As such, the term "gas" may refer to hydrogen, helium, nitrogen, oxygen, or any other gas or a combination of gases, including air, for example. Furthermore, in the disclosure and in the claims, the term "opening" may refer to any aperture or channel, including a port coupled to or integral with the container, for example, through which gas and/or fluid can flow.

Embodiments of the present invention comprise a gas source, a fluid source and a measuring system. In one embodiment, the gas source includes a tank or container having a gas therein. In another embodiment, the gas source is the surrounding (atmospheric environment and the gas contained therein is the atmospheric air.

The fluid source includes a non-collapsible walled container having fluid therein. The gas source is coupled in fluid communication with the fluid source so as to allow gas from the gas source to enter or exit the fluid source as fluid flows. In one embodiment, the measuring system is interposed between the gas and fluid sources and measures the mass flow and density of the gas that is transferred between the gas source and the fluid source so as to calculate the amount of fluid dispensed from the fluid source based on the volume of gas flowing into the fluid source. As such, in accordance with the present invention, the amount of fluid dispensed is measured in a more accurate, less complicated, and less expensive manner.

Figure 1:
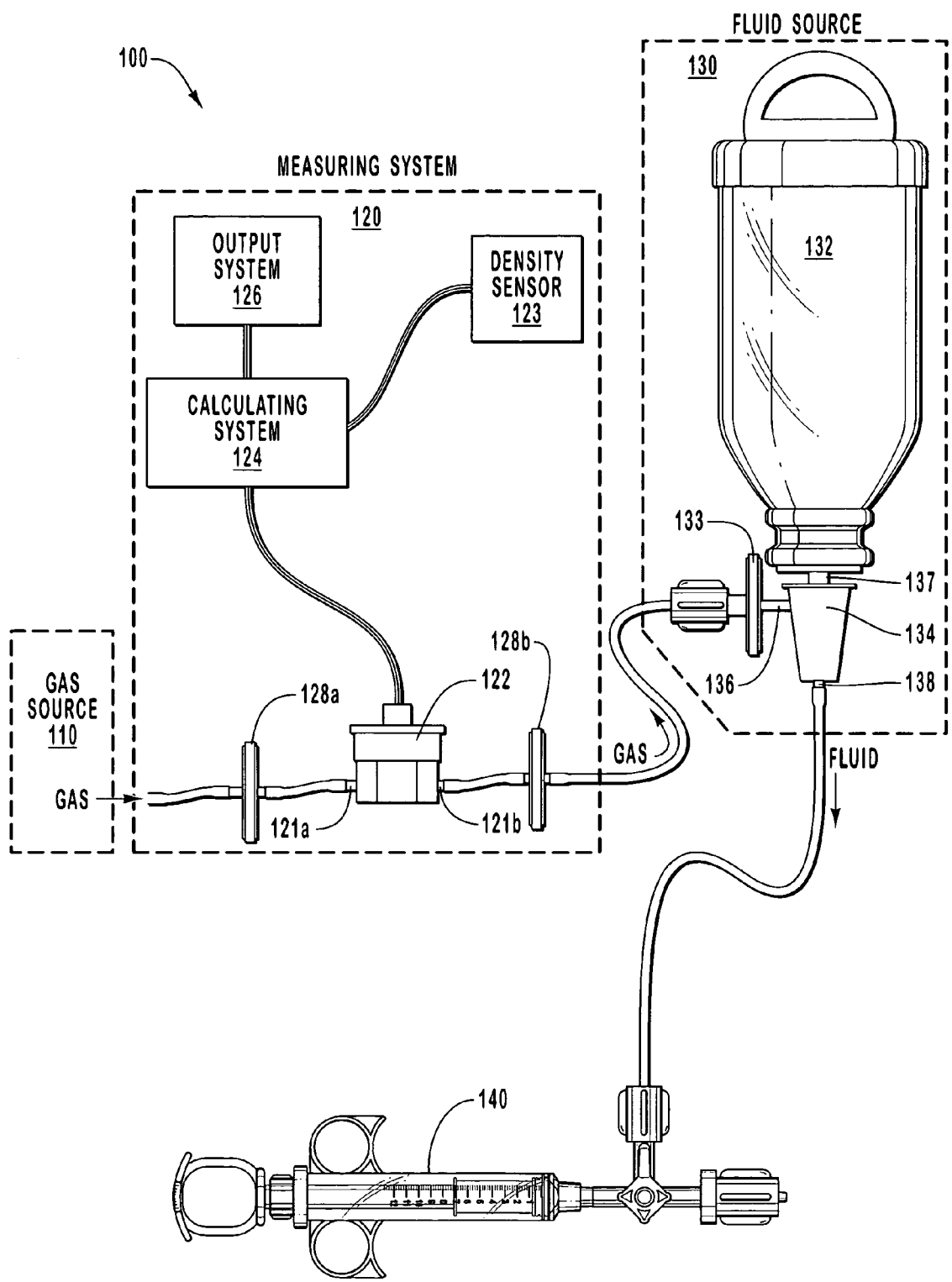
FIG. 1 illustrates a syringe in fluid communication with a fluid source that dispenses fluid to the syringe and is in fluid communication with a calculating system that calculates the volume of fluid dispensed.

With reference now to FIG. 1, an example of a suitable environment in which the invention may be implemented is provided. While the embodiment of FIG. 1 illustrates a fluid dispensing system 100 that may be used in connection with a fluid delivery system 140, those skilled in the art will appreciate that the present invention may be practiced in a variety of system configurations that include a fluid source, a gas source, and some kind of a measuring system so as to measure the amount of fluid dispensed.

In FIG. 1, an exemplary system for implementing the present invention is illustrated as fluid dispensing system 100, which includes a measuring system 120 interposed between a gas source 110 and a fluid source 130. As fluid is dispensed or displaced from fluid source 130, gas flows from gas source 110, through measuring system 120, and into fluid source 130, as will be further explained below.

Gas source 110, may be any type of gas supply that contains gas therein, including a tank, a container and/or the atmospheric environment. In an embodiment where gas source 110 is an enclosed tank or container having gas stored therein, gas source 110 is coupled in fluid communication with measuring system 120. In an alternative embodiment, where gas source 110 is the atmospheric environment surrounding the fluid dispensing system 100, a gas inlet port coupled to the measuring system 120 allows air to enter into the measuring system 120.

Measuring system 120 senses the volume of gas entering a container of the fluid source as fluid is dispensed therefrom and thereby calculates the volume of fluid dispensed. In the embodiment of FIG. 1, measuring system 120 comprises a sensor for sensing the mass flow and density of the gas entering a container 132 of the fluid source 130. The sensor of the present invention can be a single sensor that performs both functions of sensing the mass flow of gas and the density of gas, or can be a dual sensor wherein one sensor component senses the mass flow of gas and another sensor component senses the density of gas. Optionally, a measurement of the gas density can be preprogrammed into the sensor or the calculating system such that the sensor only senses the mass flow of the gas, as will be further explained below. Optionally, the volume of gas entering the container may be measured in a variety of different manners.

In FIG. 1, the sensor is a dual sensor wherein one sensor component is illustrated as sensor 122, which is in fluid communication with an inlet port 121a and an outlet port 121b, and another sensor component is illustrated as density sensor 123. Sensor 123 measures the density of the air or other gas. Gas from gas source 110 (e.g., air) enters inlet port 121a, flows through sensor 122, and exits outlet port 121b. As the gas flows through sensor 122, the mass flow of the gas is measured. Sensor 122 is an example of a means for sensing the amount of gas flowing. While sensor 122 may be any sensor that measures the mass flow of gas, in the illustrated embodiment sensor 122 is a mass flow meter. By way of example, one mass flow meter that may be used as sensor 122 is an AWM3000 series mass airflow sensor that is available from Honeywell Inc., 11 West Spring Street; Freeport, Ill. 61032. Sensor 123 may comprise a barometer or altimeter, for example.

As illustrated in FIG. 1, measuring system 120 may further comprise a calculating system 124 that is in communication with sensor 122. Calculating system 124 is an example of a means for calculating the amount of fluid displaced and may comprise one or more mechanical and/or electrical systems that are used to calculate the amount of gas that enters fluid source 130 based on a measurement of the mass flow of gas through sensor 122 and a measurement of the density of the gas. In the illustrated embodiment, the measurement for the mass flow of gas is obtained by sensor 122 and the measurement for the density of gas is obtained by density sensor 123. Both the measurement of the mass flow of gas and the density of gas are transmitted to calculating system 124. Optionally, calculating system 124 is preprogrammed with a measurement of the density of the gas. Sensor 123 and a preprogrammed calculating system 124 are each examples of means for obtaining a density value of a gas.

An electrical system of calculating system 124 may comprise an analog-to-digital converter and/or a special purpose or general purpose computer including various computer hardware and/or software for calculating the amount of gas flowing into a fluid source. Calculating system 124 may further include a computer-readable medium for carrying or having computer-executable instructions or data structures stored thereon that can be accessed by a general purpose or special purpose computer. Computer-executable instructions comprise, for example, instructions and/or data structures that cause a general purpose computer, special purpose computer, or special purpose processing device to perform a certain function or group of functions, such as calculating the amount of gas flowing into a fluid source.

Those skilled in the art will appreciate that calculating system 124 may comprise computing environments with many types of computer system configurations, such as a personal computer, calculator, hand-held device, multi-processor system, microprocessor-based or programmable consumer electronic device, a network PC, minicomputer, mainframe computer, or one or more similar devices, for example. In one embodiment, calculating system 124 comprises a general purpose computing device in the form of a conventional computer that is coupled to an output device 126, such as a monitor, printer, speaker or other output device. Output device 126 is an example of a means for informing a user of the amount of fluid displaced and may include a visual and/or audible notification to inform a user as to the amount of fluid displaced or alternatively the amount of fluid available for displacement. Furthermore, calculating system 124 may operate in a networked environment using logical connections to one or more remote computers.

Fluid source 130 is coupled in fluid communication to measuring system 120 and includes a container 132 having fluid therein. Container 132 is an example of a non-collapsible means for containing fluid. In the illustrated embodiment, container 132 is a non-collapsible walled container that comprises a rigid material. Examples of such rigid materials include glass, plastic, metal, wood, or any other material that is non-deformable such that as the fluid is dispensed from the container and a vacuum is created, the container walls do not collapse.

Coupled to container 132 are one or more ports. The ports allow for fluid to be dispensed or displaced from container 132 and gas to enter into container 132. In the illustrated embodiment, a vented spike 134 is coupled to container 132 to provide the one or more ports. The vented spike 134 includes a gas inlet port 136 and a fluid outlet port 138, each of which is configured to be placed in fluid communication with a container connection port 137 configured to be in fluid communication with container 132. Gas inlet port 136 is configured to be in fluid communication with sensor 122, port 138 is configured to be in fluid communication with fluid delivery system 140, and port 137 is configured to be in fluid communication with container 132.

By way of example, a type of vented spike that may be used as spike 134 to allow liquid to dispense from container 132 and gas to enter container 132 is a Burron OEM vented piercing device, aka a dual flow piercing device, available from Burron OEM, a division of B. Braun Medical, Inc., 824 12$^{th}$ Avenue, Bethlem, Pa. 18018.

Spike 134 allows gas to enter container 132 through port 137 while fluid exits container 132 and flows into fluid delivery system 140 through port 138. Nevertheless, while FIG. 1 illustrates a vented spike having a fluid outlet port, a container port and a gas inlet port, a variety of one or more ports may be employed to allow the fluid to dispense from container 132 and gas to enter into container 132. By way of example, one port may be employed for both the inflow of gas and outflow of fluid. Alternatively, a plurality of ports may be utilized, including one or more gas inlet ports coupled in fluid communication to container 132 and one or more fluid outlet ports coupled in fluid communication to container 132. A plurality of gas inlet ports and/or a plurality of fluid outlet ports may be utilized, or any other combination of one or more ports to allow fluid to dispense from container 132 and gas to enter into container 132. By way of example, the fluid container may comprise a vented bottle having a non-vented spike coupled thereto.

As fluid is dispensed from fluid source 130, gas is transferred from gas source 110, through measuring system 120 and into fluid source 130. The transfer of the gas occurs from a hydrostatic pressure in the fluid source 130 that causes the gas to flow from gas source 110, and into fluid source 130. As the gas flows through the measuring system 120, the flow and density of the gas flowing therethrough is obtained to calculate the amount of fluid dispensed based on the amount of gas flowing into the fluid source 130.

To provide for and maintain a sterile environment, fluid dispensing system 100 may optionally include a filtering system coupled to sensor 122 in order to eliminate any impurities present in the gas. In the illustrated embodiment, the filtering system comprises filters 128a, 128b and 133, where filter 128a is coupled at inlet port 121a, filter 128b is coupled to outlet port 121b, and filter 133 is coupled to gas inlet port 136 of fluid source 130. While the filtering system illustrated in FIG. 1 includes three filters, embodiments of the present invention include filtering systems having more than three filters or less than three filters.

When fluid is dispensed from the fluid source 130, hydrostatic pressure in fluid source 130 causes gas to be transferred from the gas source 110, through the measuring system 120 and into the fluid source 130. As the gas flows through the measuring system 120, an amount of gas flowing therethrough is measured to calculate the volume of fluid dispensed based on the volume of gas flowing into the fluid source 130.

While the embodiment of FIG. 1 illustrates a fluid dispensing system, embodiments of the present invention also embrace systems and methods for calculating a volume of fluid introduced into a container. In such embodiments, the measuring system calculates the volume of fluid introduced by sensing the flow of air exiting the container as fluid is introduced. Furthermore, embodiments of the present invention also embrace systems and methods for calculating the volume of fluid dispensed and introduced by sensing air flow. By way of example, a bi-directional sensor may be employed to sense the flow of air into or out of the container due to the respective flow of fluid out of or into the container. Such systems are particularly useful when the fluid is, for example, an expensive fluid and any portion of the fluid that is dispensed from the container but has remained unused (i.e. remained in the sterile environment) can be saved by being introduced back into the container. As such, a total volume of fluid can be obtained even after fluid is dispensed and then re-introduced into the container. Therefore, the systems and methods of the present invention accurately calculate an amount of fluid dispensed and/or introduced.

In one embodiment, the calculating system calculates the amount of fluid dispensed as depicted and discussed with reference to the flow chart of FIG. 2. In one embodiment, the gas source 110 is the atmospheric air and density sensor 123 measures the density of the atmospheric air while sensor 122 measures the mass flow of the air flowing therethrough.

Figure 2:
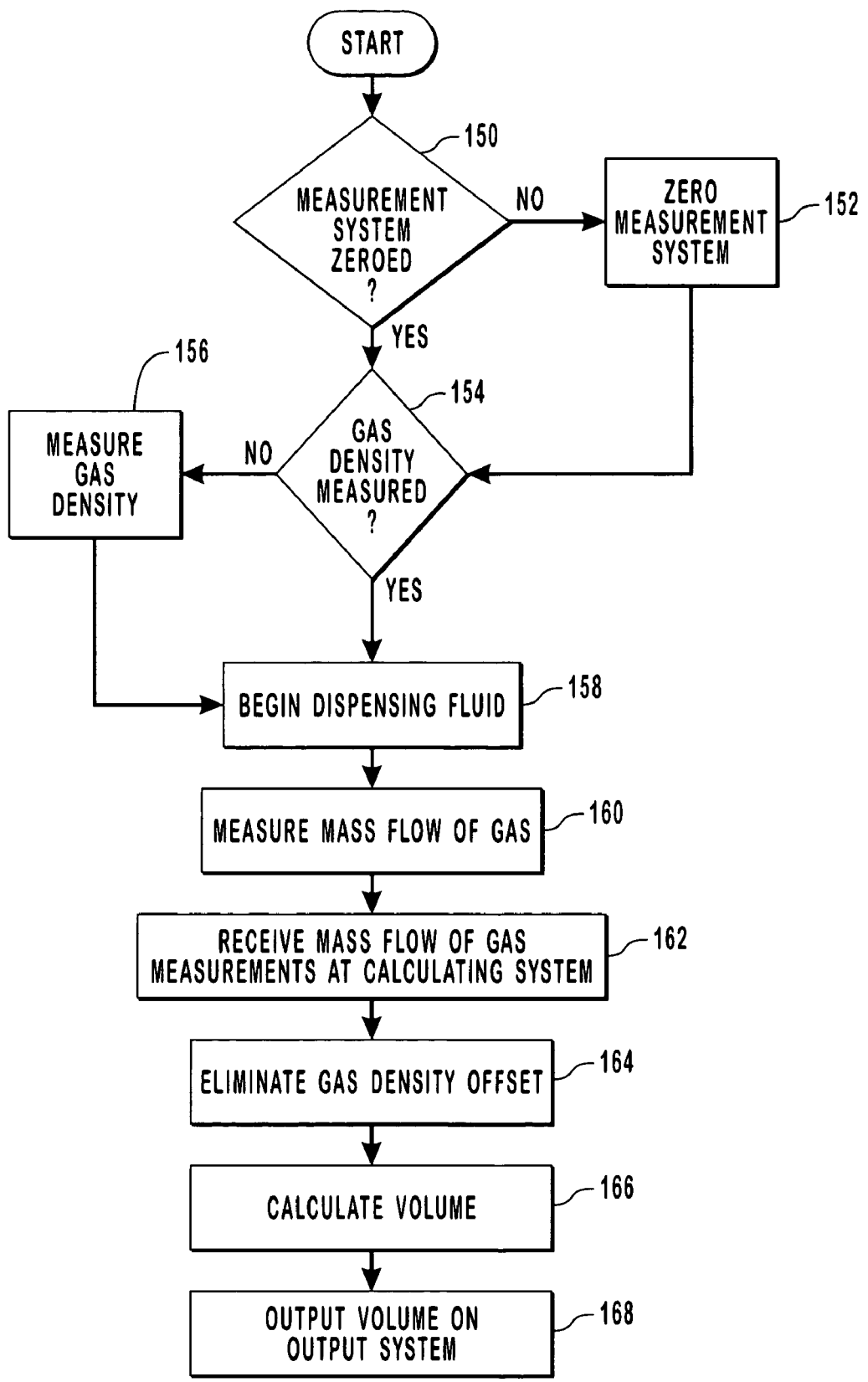
FIG. 2 is a flow chart that illustrates an exemplary embodiment for calculating the volume of fluid dispensed from a container based on mass flow and density measurements of gas that enters the container due to the fluid being dispensed.

In FIG. 2, execution begins at decision block 150 where a determination is made as to whether or not the components of the measuring system have been zeroed. The process of zeroing (e.g., initializing) components that are used to obtain measurements can provide a more accurate measurement, and is more fully described in U.S. Pat. No. 5,807,321, entitled SYSTEM FOR ELECTRONICALLY MONITORING THE DELIVERY OF CONTRAST MEDIA, filed Sep. 15, 1998, which is incorporated herein by reference. If it is determined at decision block 150 that the components of the measuring system have been zeroed, execution proceeds to decision block 154. Alternatively, if it is determined that the components of the measuring system have not been zeroed, execution proceeds to step 152 for the automatic zeroing of the components of the measuring system and execution then proceeds to decision block 154.

At decision block 154, a determination is made as to whether or not the density of gas has been measured or provided. By way of example, the units of the density of gas are mass per volume (e.g., g/cc). As provided above, the density of gas may be measured by the same sensor component that measures the mass flow of gas or by a separate density sensor component. If it is determined at decision block 154 that the density of gas has been measured, execution proceeds to step 158. Alternatively, if the density of gas has not been measured, execution proceeds to step 156, where a value is obtained for the density of the gas and then execution proceeds to step 158.

At step 158, dispensing of the fluid contained within the non-collapsible walled container begins. The dispensing of the fluid causes a hydrostatic pressure within the non-collapsible walled container to change, resulting in gas flowing from the gas source, through the measuring system and into the non-collapsible walled container of the fluid source. As the gas flows, the mass flow of gas is measured by a sensor at step 160 and is communicated to the calculating system. The units of the mass flow of gas are, for example, grams per second (g/s). At step 162, the mass flow of gas measurements obtained at step 160 are received by the calculating system, which calculates the amount of fluid dispensed from the non-collapsible walled container of the fluid source based on the mass flow and the density of the gas.

At step 164, the calculating system eliminates any gas density offset from the measurements obtained at step 160 of the mass flow of gas. For example, dividing the mass flow (e.g., g/s) by the density (e.g., g/cc) to yield flow (e.g., cc/s) eliminates the density offset. At times, the volume flow of fluid (e.g., cc/s) is what is desired to be output on an output system. In such instances, the flow of gas (e.g., cc/s) obtained at step 164 corresponds to the volume flow of fluid (e.g., cc/s) and is thus output on an output system at step 168.

By way of example, volume flow can be calculated as depicted in Equation 1 below.

$$\text{Volume Flow} = \frac{\text{massflow}}{\text{density}} = \frac{\frac{g}{s}}{\frac{g}{cc}} = \frac{cc}{s} \qquad \text{Equation 1}$$

Alternatively, it may be desired to obtain the total volume of fluid. Therefore, once the flow of gas (e.g., cc/s) is obtained at step 164, execution proceeds to step 166 to calculate the total volume of gas (e.g., cc), which corresponds to the total volume of fluid.

At step 166, the volume of the gas that entered into the non-collapsible walled container is calculated. While the volume of gas can be calculated in a variety of manners, one way of calculating the volume is illustrated by the present example and includes obtaining the parameters of mass flow (step 160) and density of the gas (step 156), eliminating a density offset (step 164), and at step 166 integrating with respect to time the gas flow obtained at step 164. The volume of the gas that entered into the non-collapsible walled container represents the volume of fluid dispensed therefrom. By way of example, the total volume may be calculated as depicted in Equation 2 below.

$$\text{Total Volume} = \int \text{Volume Flow} \cdot dt = \int \frac{cc}{s} \cdot dt = cc \qquad \text{Equation 2}$$

Execution then proceeds to step 168 for outputting (e.g., displaying, broadcasting, transmitting, etc.) the total volume of fluid dispensed on a display screen, digital display, or other output system. The volume of fluid dispensed may be displayed in a variety of manners, including graphically, by percentage, pictorially, or otherwise. Furthermore, the display screen or other output system may display the volume of fluid dispensed from the fluid source, the volume of fluid currently available in the fluid source, the volume delivered to a particular patient, etc.

Thus, the present invention extends to both systems and methods for measuring the amount of fluid dispensed from and/or introduced into a fluid source through the utilization of the flow and density of gas. The present invention may measure liquid such as a contrast medium, or other liquids, gasses, or fluids. A practitioner or user can therefore know at any given instant in time the amount of liquid (such as a contrast medium or other fluid) that has been dispensed from a fluid source and the amount of fluid still available in the fluid source. Furthermore, the systems and methods of the present invention measure and obtain the amount of fluid in a sterile, reliable and accurate manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for dispensing liquid contrast medium and for accurately determining the amount of liquid contrast medium dispensed of, the system comprising:
   a non-collapsible means for containing the liquid contrast medium;
   means for sensing both mass flow and density of gas flowing into said non-collapsible means for containing the liquid contrast medium as the liquid contrast medium is dispensed from the non-collapsible means, said gas filling a volume within the non-collapsible means so as to replace with said gas the volume of contrast medium dispensed; and
   means, coupled to said means for sensing, for using the mass flow and density of said sensed gas to calculate the volume of gas used to replace the dispensed contrast medium, thereby determining the amount of dispensed contrast medium.

2. A system as recited in claim 1, wherein the dispensed contrast medium ans the gas that flows into the non-collapsible means both flow through a common opening in the non-collapsible means.

* * * * *

UNITED STATES PATENT AND TRADEMARK OFFICE
CERTIFICATE OF CORRECTION

| | | |
|---|---|---|
| PATENT NO. | : 7,035,741 B2 | Page 1 of 1 |
| APPLICATION NO. | : 10/872212 | |
| DATED | : April 25, 2006 | |
| INVENTOR(S) | : Taylor | |

It is certified that error appears in the above-identified patent and that said Letters Patent is hereby corrected as shown below:

Column 9
Line 5, remove "of"

Column 10
Line 9, change "ans" to --and--

Signed and Sealed this

Twenty-eighth Day of November, 2006

JON W. DUDAS
*Director of the United States Patent and Trademark Office*